UNITED STATES PATENT OFFICE.

JOHN H. THICKENS, OF BATHURST, NEW BRUNSWICK, CANADA, ASSIGNOR TO THE BEAVER COMPANY, OF BUFFALO, NEW YORK, A CORPORATION OF OHIO.

ADHESIVE.

1,377,739.   Specification of Letters Patent.   Patented May 10, 1921.

No Drawing. Original application filed January 20, 1915, Serial No. 3,396. Divided and this application filed December 27, 1917. Serial No. 209,058.

*To all whom it may concern:*

Be it known that I, JOHN H. THICKENS, a citizen of the United States, residing at Bathurst, Province of New Brunswick, Dominion of Canada, have invented certain new and useful Improvements in Adhesives, (division of my application Serial No. 3,396, filed January 20, 1915;) and I hereby declare the following to be a full, clear, and exact description of the invention, such as will enable others skilled in the art to which it appertains to make and use the same.

The present invention relates to wall board and particularly to wall board composed of a plurality of layers or plies of material.

It is an object of the present invention to produce a multi-ply board of great rigidity, to insure a strong bond of the several plies to one another, to reduce waste in the manufacturing operation, and to lessen the cost for adhesive material. With the foregoing objects, and others which will hereafter appear, I make use of a special silicate cement which can be compounded in convenient and economical manner, and which can be used with marked advantage in binding or bonding the several plies of material into a composite or multi-ply board.

In its preferred form, this silicate adhesive comprises sodium silicate, or its equivalent, water and clay. The proportions may vary somewhat, but good results are obtainable when the ingredients are mixed in the proportions of 100 lbs. silicate of about 40° Baumé with 92 lbs. of clay and 15 lbs. of water. This amout of water reduces the silicate to a density of approximately 35° Baumé. The clay may be either refactory or non-refractory, but I prefer to use a non-refractory clay, since this absorbs the silicate more easily and is much easier to make. The clay should be fine enough to pass through a 100 mesh sieve.

The operation of mixing the foregoing ingredients may be carried out in several ways, and a satisfactory procedure is as follows: The required amount of silicate is run into a mixing machine, the one which I use is of the Dopp type, and the water and clay are there added and the mixture is agitated for a period of approximately a half hour, or until a thorough mechanical mixing is secured. After this, the mixture is run to a storage tank where it is allowed to remain for a period of about one hour, or until the clay absorbs all of the silicate which it can absorb. When the water is added to the silicate in the mixing machine, the density is reduced from about 40° Baumé to approximately 35° Baumé, and after the mixing and aging operations are complete, the mixture has a density of about 45° to 50° Baumé. The clay which I have used with the best results has a weight of approximately 36 lbs. per cubic foot when in the pulverized state.

The mixture above described sets much slower than an ordinary silicate adhesive as used in the wall board art and gives a much stronger bond, and at the same time by its increased viscosity makes possible a more efficient laminating with less waste in the manufacturing operation.

The several plies or layers of material to which this adhesive is to be applied may be of material commonly used in the manufacture of wall board, such as ground wood pulp or waste paper or cooked pulp used alone or intermixed, and the several plies to be pasted or cemented together may be of different material, as, for instance, ground wood layers alternating with cooked wood layers.

The adhesive may be applied in the usual manner, due allowance being made for its greater viscosity, and for its retarded setting, and wall boards thus constructed are strongly bonded together and have a rigidity much greater than when made with ordinary silicate, this increase amounting to from 20% to 30%, the expense for adhesive is materially reduced because of the diluting and distributing action of the pulverized clay, and I have found that in practice there is a marked reduction in the waste of manufacture.

Wall boards constructed as above described may be used generally as a building material by nailing or tacking directly to the studding of a room where they serve in place of lath and plaster as in inner wall of the room, being ornamented with paint or the like as desired. After the silicate is once set, the bonding between plies is permanent, and there is in the bonding material no ingredient likely to deteriorate with age or with changing atmospheric conditions, and no material likely to soften or become impaired by heat as when the wall board is used around registers or radiators or the like.

I claim:—

1. The process which consists in thoroughly mixing sodium silicate of about 35° Baumé with about 80% by weight of clay, and allowing the mixture to stand for a period of about an hour to permit the clay to absorb silicate, thereby producing a slow-setting adhesive of relatively high viscosity suitable for use in bonding the plies of a laminated wall board, substantially as described.

2. The process which consists in thoroughly mixing sodium silicate of about 35° Baumé with about 80% by weight of non-refractory clay, by mechanical agitation for about a half hour, and then allowing the mixture to stand until the clay absorbs all of the silicate which it can absorb, thereby producing a slow-setting adhesive of relatively high viscosity suitable for use in bonding the plies of a laminated wall board, substantially as described.

3. The process of producing a clay silicate adhesive of relatively high viscosity suitable for use in bonding the plies of a laminated wall board which consists in thoroughly mixing an aqueous solution of sodium silicate with a substantial amount of clay, such mixing being effected by mechanical agitation of the mixture for about one-half hour, and then allowing the mixture to stand for a period of about one hour so as to permit the clay to absorb the silicate solution to the necessary extent.

4. The process of producing a clay silicate adhesive of relatively high viscosity suitable for use in bonding the plies of a laminated wall board which comprises mechanically agitating for a period of at least one half hour a mixture of an aqueous solution of sodium silicate and clay, the clay being fine enough to pass through 100 mesh sieve, and then allowing the mixture to stand for at least one hour so as to permit the clay to absorb the silicate solution to the necessary extent.

In testimony whereof I affix my signature.

JOHN H. THICKENS.